United States Patent
Corvinelli et al.

(10) Patent No.: US 7,478,083 B2
(45) Date of Patent: Jan. 13, 2009

(54) METHOD AND SYSTEM FOR ESTIMATING CARDINALITY IN A DATABASE SYSTEM

(75) Inventors: Vincent Corvinelli, Mississauga (CA); Yuri Deigin, Richmond Hill (CA); John F. Hornibrook, Markham (CA); Tam Minh Dai Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 11/278,532

(22) Filed: Apr. 3, 2006

(65) Prior Publication Data

US 2007/0233634 A1    Oct. 4, 2007

(51) Int. Cl.
G06F 17/30 (2006.01)
G06F 17/00 (2006.01)

(52) U.S. Cl. ............... 707/3; 707/1; 707/2; 707/4; 707/5; 707/100

(58) Field of Classification Search ............ 707/3, 707/1–5
See application file for complete search history.

(56) References Cited

U.S. PATENT DOCUMENTS

| | | | | |
|---|---|---|---|---|
| 5,761,653 A * | 6/1998 | Schiefer et al. | ............... | 707/2 |
| 5,899,986 A * | 5/1999 | Ziauddin | ............... | 707/2 |
| 5,995,957 A | 11/1999 | Beavin et al. | | |
| 6,272,487 B1 * | 8/2001 | Beavin et al. | ............... | 707/2 |
| 6,366,901 B1 * | 4/2002 | Ellis | ............... | 707/2 |
| 6,477,523 B1 * | 11/2002 | Chiang | ............... | 707/2 |
| 6,539,371 B1 * | 3/2003 | Bleizeffer et al. | ............... | 707/2 |
| 6,865,567 B1 * | 3/2005 | Oommen et al. | ............... | 707/2 |
| 7,302,422 B2 * | 11/2007 | Bossman et al. | ............... | 707/2 |
| 2002/0198867 A1 * | 12/2002 | Lohman et al. | ............... | 707/3 |
| 2003/0135485 A1 * | 7/2003 | Leslie | ............... | 707/3 |
| 2004/0010488 A1 * | 1/2004 | Chaudhuri et al. | ............... | 707/3 |
| 2005/0004907 A1 * | 1/2005 | Bruno et al. | ............... | 707/4 |
| 2005/0065911 A1 * | 3/2005 | Ellis et al. | ............... | 707/2 |
| 2005/0091183 A1 * | 4/2005 | Cunningham et al. | ............... | 707/1 |
| 2005/0108199 A1 * | 5/2005 | Ellis et al. | ............... | 707/2 |
| 2005/0131914 A1 * | 6/2005 | Abdo et al. | ............... | 707/100 |
| 2006/0041574 A1 * | 2/2006 | Cunningham et al. | ............... | 707/101 |
| 2006/0064412 A1 * | 3/2006 | Cunningham et al. | ............... | 707/3 |
| 2006/0074875 A1 * | 4/2006 | Faunce et al. | ............... | 707/3 |
| 2006/0112093 A1 * | 5/2006 | Lightstone et al. | ............... | 707/5 |
| 2006/0149695 A1 * | 7/2006 | Bossman et al. | ............... | 706/48 |
| 2006/0253422 A1 * | 11/2006 | Narasayya et al. | ............... | 707/2 |

* cited by examiner

*Primary Examiner*—Don Wong
*Assistant Examiner*—Thanh-Ha Dang
(74) *Attorney, Agent, or Firm*—Sawyer Law Group LLP

(57) ABSTRACT

A method and system for estimating cardinalities for a plurality of columns in a database system is disclosed. The method and system include obtaining statistics collected for the plurality of columns. A first portion of the statistics indicates at least one relationship between at least a portion of the plurality of columns, while a second portion of the statistics includes single column statistics. The method and system also include utilizing the first portion and the second portion of the statistics to estimate the cardinality for the plurality of columns.

10 Claims, 4 Drawing Sheets

US 7,478,083 B2

METHOD AND SYSTEM FOR ESTIMATING CARDINALITY IN A DATABASE SYSTEM

FIELD OF THE INVENTION

The present invention relates to database systems and more particularly to a method and system for estimating cardinality in the database system.

BACKGROUND OF THE INVENTION

In database systems query execution plans are used to provide a preferred method for executing a particular query on the database system. To provide the query execution plan, the cardinality of the key, or group of columns, in the query is determined. The cardinality of a group of columns is the number of distinct values present in that group of columns at the time of query execution. The cardinality can thus be used to determine the number of rows that will be used in executing the query. Consequently, the cost of each query execution plan can be tallied. Based on the cost, a query execution plan can be selected. Thus, use of the cardinality allows for better selection of query execution plans.

FIG. 1 depicts a conventionally method 10 for estimating the cardinality for a group of columns, such as a key for a query. Statistics for single columns are obtained, via step 12. Typically, step 12 includes obtaining the cardinality for each individual column. The statistics for single columns are used in estimating the cardinality for the group of columns assuming that the columns are independent, via step 14. Typically, step 14 is accomplished by multiplying the individual cardinalities of the columns. The cardinality obtained in step 14 is an upper bound for the cardinality of the group of columns. Once the cardinality for the column group has been obtained, the cardinality can be used, for example in obtaining a query execution plan.

Although the conventional method 10 functions, one of ordinary skill in the art will readily recognize that the cardinality obtained in step 14 may result in a sub-optimal query execution plan. For example, the cardinality obtained in step 14 may be particularly poor after operations, such as GROUP BY or DISTINCT operations, are performed. When table(s) are first provided, columns in the tables may be statistically correlated. Operations such as grouping or duplicate removal operations may be performed on certain columns in the tables. A grouping operation takes rows having the same value for the columns in the grouping key and provides a single row from these rows. A duplicate removal operation may be considered a special case of the grouping operation and keeps only one row of a group of identical rows in the key. After such operations are performed, the conventional method 10 provides a cardinality that may differ significantly from the actual cardinality of the columns in the key because method 10 does not account for statistical correlation between columns. As a result, operations that use the cardinality may not perform as desired. For example, a query execution plan determined using the cardinality estimated in a conventional manner may have costs that are significantly greater than an optimal query execution plan.

Accordingly, what is needed is a method and system for improving the estimation of the cardinality of a group of columns, particularly after operations such as a grouping and/or duplicate removal operation has been performed. The present invention addresses such a need.

BRIEF SUMMARY OF THE INVENTION

The present invention provides a method and system for estimating cardinality for a plurality of columns in a database system. The method and system comprising obtaining statistics collected for the plurality of columns. A first portion of the statistics indicates at least one relationship between at least a portion of the plurality of columns, while a second portion of the statistics includes single column statistics. The method and system also comprise utilizing the first portion and the second portion of the statistics to estimate the cardinality for the plurality of columns. In a preferred embodiment, the statistics are utilized in a manner that may provide an optimal estimation of the cardinality of the plurality of columns.

According to the method and system disclosed herein, the present invention provides a more accurate mechanism for estimating cardinalities in a database system. In a preferred embodiment, a better upper bound for the cardinality of the plurality of columns of interest is obtained.

DETAILED DESCRIPTION OF THE INVENTION

The present invention relates to database systems. The following description is presented to enable one of ordinary skill in the art to make and use the invention and is provided in the context of a patent application and its requirements. Various modifications to the prefeffed embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for estimating cardinality for a plurality of columns in a database system. The method and system comprise obtaining statistics collected for the plurality of columns. A first portion of the statistics indicates at least one relationship between at least a portion of the plurality of columns, while a second portion of the statistics includes single column statistics. The method and system also comprise utilizing the first portion and the second portion of the statistics to estimate the cardinality for the plurality of columns.

Figure 1:
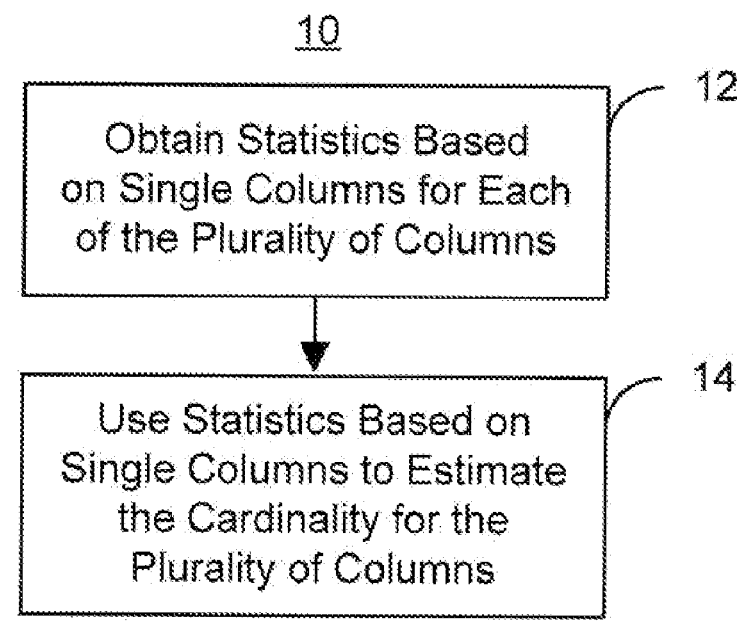
FIG. 1 is a diagram depicting a conventional method for estimating cardinality in a database system.
Figure 2:
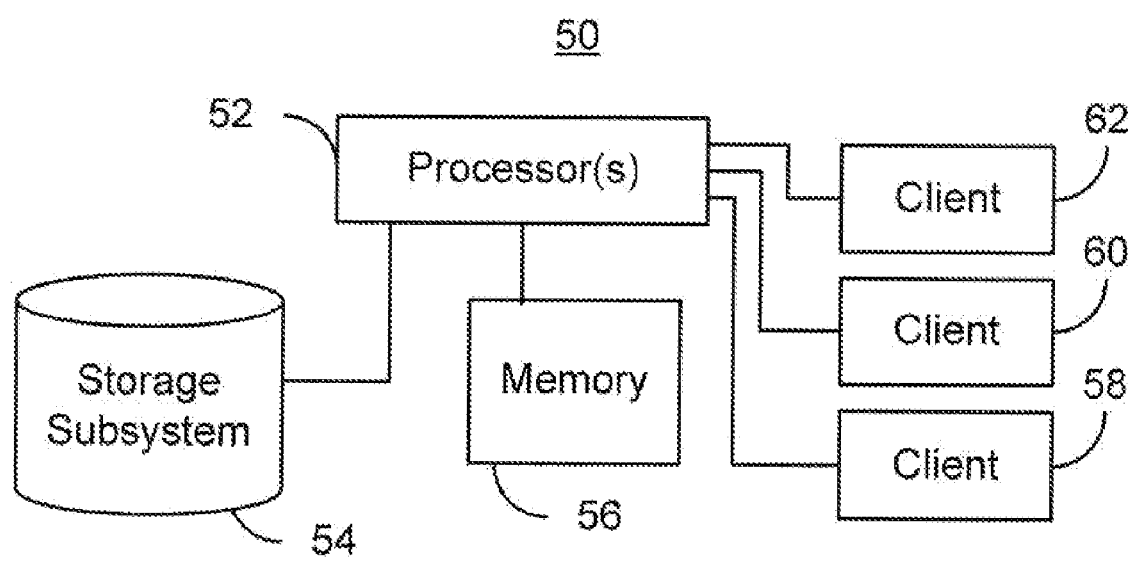
FIG. 2 is a diagram depicting one embodiment of a data processing system used in conjunction with the method and system in accordance with the present invention.

The present invention is described in the context of particular methods and database systems. However, one of ordinary skill in the art will readily recognize that other systems and other methods having other and/or additional steps consistent with the present invention could be used. The present invention will also be described in terms of particular database systems and particular examples. However, one of ordinary skill in the art will readily recognize that the present invention may be sued with other database systems and other column groups.

to more particularly describe the present invention, refer to FIG. 2 depicting one embodiment of a database system 50 used in conjunction with the method and system in accordance with the present invention. The database system 50 may define or be part of a larger database system. The database system 50 includes processor(s) 52 that may be part of a server system (not explicitly shown), a storage subsystem 54, local memory 56 that may be part of a server system, and clients 58, 60, and 62. The clients 58, 60, and 62 may be employed by users (not shown) to provide input to and receive output from the database system 50. One or more of the processor(s) 52 may also be used to determine a query execution plan, and thus be considered part of a query optimizer. The storage subsystem 54 is preferably used as long term storage for tables, table spaces and/or other database objects of the database system. The local memory 56 may be used by the processor(s) 52. Note that although not explicitly depicted, one or more of the components 52, 54, 56, 58, 60, and 62 may be coupled through a network, such as a LAN or the Internet.

Figure 3:
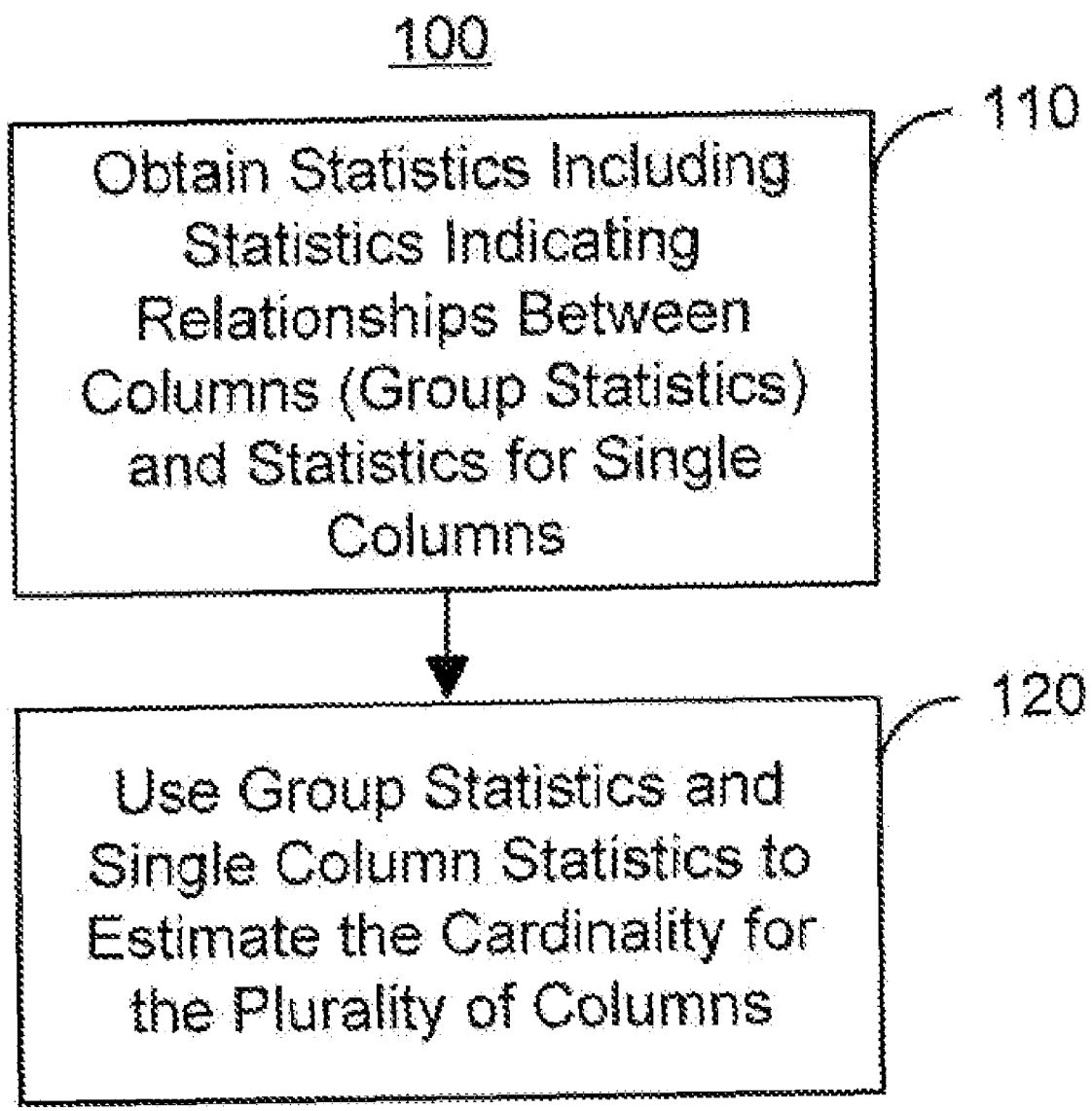
FIG. 3 is a flow chart of one embodiment of a method in accordance with the present invention for estimating the cardinality for columns in a database system.

FIG. 3 is a flow chart of one embodiment of a method 100 in accordance with the present invention for estimating the cardinality for a group of columns in a database system, such as the database system 50. Consequently, the method 100 is described in the context of the database system 50 depicted in FIG. 2. The method 100 is also performed for columns (not explicitly shown) for at least one database object (not explicitly shown) archived in the storage subsystem 54. In some embodiments, the columns may be for different tables, or database objects, stored in the storage subsystem 54. Also in a preferred embodiment, the method 100 is performed by the processor(s) 52. In a preferred embodiment, the method 100 is performed for columns in a group, or key, that have been subject to operation(s) such as grouping and/or duplicate removal operations. The columns for which the method 100 is used may also be those columns used in a particular query. Thus, the cardinality being estimated by the method 100 may be used in determining a desired query execution plan.

Statistics for the group of columns are obtained, via step 110. Step 110 obtains both statistics that account for the relationship between columns in the group and single column statistics. Thus, a first portion of the statistics indicates the relationship(s) between at lest some of columns. A second portion of the statistics includes single column statistics. These statistics are preferably collected during other operations performed in the database system. Consequently, such statistics are available for use by the method 100. However, in another embodiment, the statistics may be collected especially for the step 110.

In a preferred embodiment, statistics indicative of the relationships between columns (group statistics) include column group statistics, which provide a column group statistics (CGS) value for a certain set of columns. The CGS value indicates the number of distinct values in the set of columns for which the CGS value is obtained. Because the statistics are preferably collected during other operations, the set of columns for which the column group statistics are obtained may not be the same as the group of columns for which the column group statistics are obtained may not be the same as the group of columns in the key. For example, if the key includes columns a, b, c, d, e, and f, the CGS values may be obtained for the sets {a,b,c}, {b,c,e} and {a,e}. The single column statistics preferably include the column cardinality for each column. The column cardinality indicates the number of distinct values in an individual column assuming that the column is independent from (or not considering) all other columns.

The groups statistics and, in a preferred embodiment, the single column statistics are used to estimate the cardinality for the plurality of columns, via step 120. Step 120 may also include using column equivalency to determine which portion of the group statistics can be sued to estimate the cardinality. Column equivalency can arise, for example, from a predicate (or a condition) specified in the query by which one column is equated to another. After the condition has been applied to the data stream, the two columns become equivalent. Also in a preferred embodiment, step 120 recursively calculates the cardinality of the columns in the key using the group statistics and the single column statistics. Thus, full use of the group statistics may be achieved.

For example, if the plurality of columns for which the cardinality is being determined spans a prefix of an index key, the cardinality can be estimated using the group statistics provided by the cardinality of the index prefix. In such an embodiment, the cardinality is the minimum of the product of the cardinalities of each of the plurality of columns determined from individual statistics and the cardinality calculated from group statistics for the columns in the index multiplied by the cardinality of the columns in the plurality of columns not in the index. Thus, if the plurality of columns includes {a,b,c,d}, the cardinality of each column as calculated by single column statistics is Ca, Cb, Cc, and Cd, the index includes columns b, c, and d, and the cardinality for group statistics is CG(i) where i are the columns, then the cardinality is: MIN(Ca*Cb*Cc*Cd, CG(b,c,d)*Ca). similarly, if indexes are not available, the cardinality may be estimated in step 120 by taking the minimum of the product of the cardinalities of each of the plurality of columns determined from individual statistics and the cardinality calculated from column group statistics for the columns having group statistics multiplied by the cardinality of the columns in the plurality of columns not in the index. Thus, if the plurality of columns includes {a,b,c,d}, the cardinality of each column as calculated by single column statistics is Ca, Cb, Cc, and Cd, column group statistics are available for columns b, c, and d, and the cardinality from group statistics is CGS(b,c,d), then the cardinality may be: MIN(Ca*Cb*Cc*Cd, CGS(b,c,d)*Ca). In addition, intersecting multi-column statistics might be used for step 120. In such an embodiment, the intersecting multi-column statistics may provide the cardinalities for the intersecting columns CG(i), where i includes a subset of the columns in the group. The cardinality for the plurality of columns may be determined as the minimum of the product of the cardinalities of each of the plurality of columns determined from individual statistics and the cardinalities calculated from intersecting multi-column statistics multiplied by the cardinality from single column statistics for remaining columns. Thus, if the plurality of columns includes {a,b,c,d,e,f}, the cardinality of each column as calculated by single column statistics is Ca, Cb, Cc, Cd, Ce, and Cf and the cardinalities from intersecting multi-column statistics are CG(a,b), CG(c,d,e), and CG(d,e,f), then the cardinality is MIN(Ca*Cb*Cc*Cd*Ce*Cf, CG(a,b)*Cc*Cd*Ce*Cf, CG(c,d,e)*Ca*Cb*Cf, CG(d,e,f)*Ca*Cb*Cc).

Furthermore, disjoint or intersecting multi-column statistics may also be used in calculating the cardinality. In such a embodiment, the cardinality for the plurality of columns may be determined as the minimum of the product of the cardinalities of each of the plurality of columns determined from individual statistics and the cardinalities calculated from multi-column statistics multiplied by the cardinality from single column statistics for remaining columns. Thus, if the plurality of columns includes {a,b,c,d,e,f}, the cardinality of each column as calculated by single column statistics is Ca, Cb, Cc, Cd, Ce, and Cf and the cardinalities from multi-column statistics are CG(a,b), CG(c,d,e), and CG(d,e,f), then the cardinality is MIN(Ca*Cb*Cd*Ce*Cf, CG(a,b) *Cc*Cd*Ce*Cf, CG(c,d,e)*Ca*Cb*Cf, CG(d,e,f) *Ca*Cb*Cc, CG(a,b)*CG(c,d,e)*Cf, CG(a,b)*CG(d,e,f) *Cc). Thus, various types of multi-column statistics may be used in determining the cardinality for the plurality of columns.

Because group statistics and, preferably, single column statistics are both used, the method 100 can better estimate the cardinality of the group columns. In particular, the method 100 may result in a smaller upper bound for the estimate of the cardinality for the column group than the conventional method 10. As a result, operations that use the cardinality of the group of columns, such as selection of a query execution plan for columns in the key for the query, may be improved.

Figure 4A:
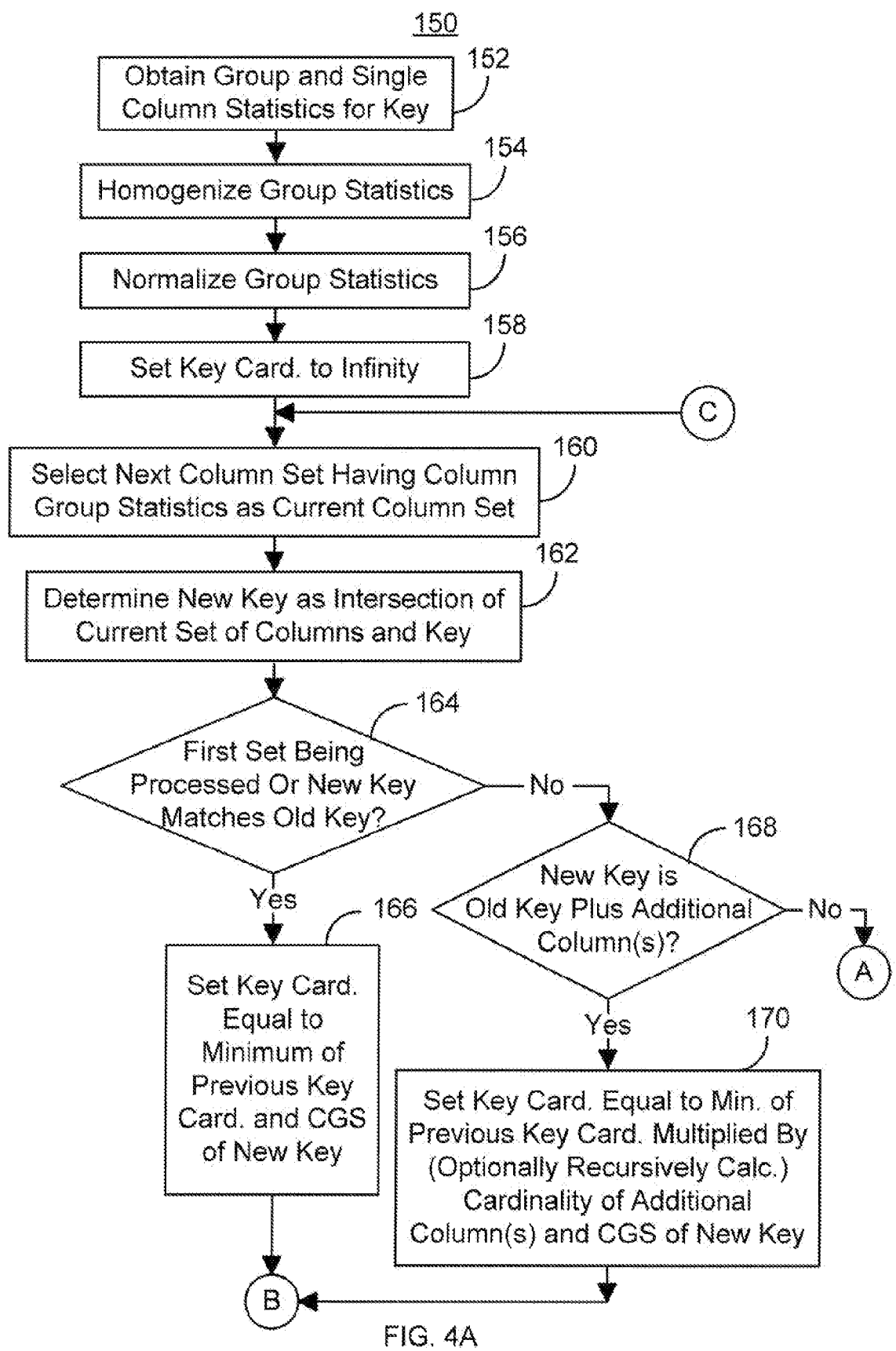
FIGS. 4A-4B is a flow chart of a preferred embodiment of a method in accordance with the present invention for estimating the cardinality for columns in a database system.
Figure 4B:
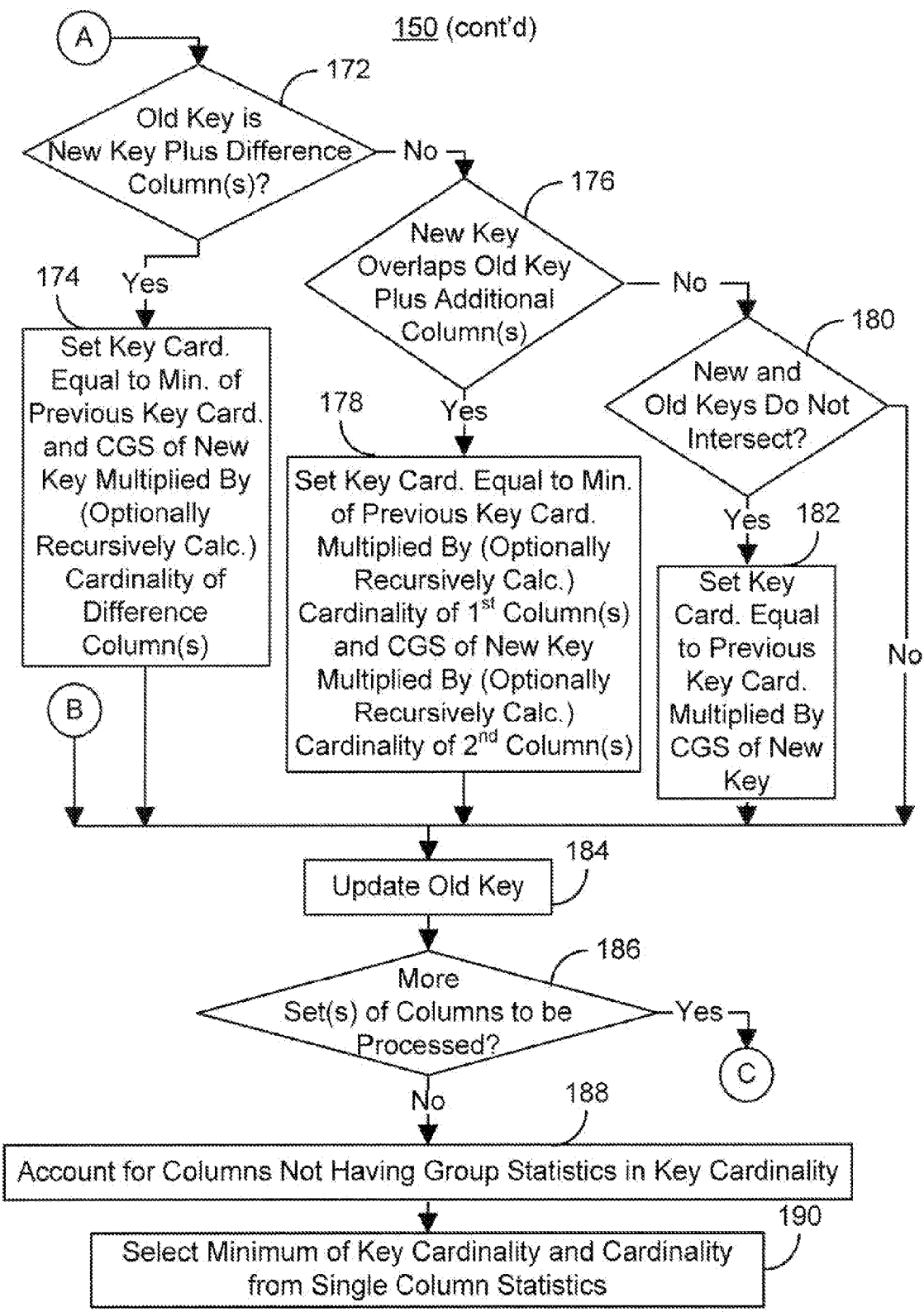

FIGS. 4A-4B is a flow chart of a preferred embodiment of a method 150 in accordance with the present invention for estimating the cardinality for columns in a database system, such as the database system 50. Consequently, the method 150 is described in the context of the database system 50 depicted in FIG. 2. The method 150 is also performed for columns (not explicitly shown) for at least one database object (not explicitly shown) archived in the storage subsystem 54. In some embodiments, the columns may be for different tables, or database objects, stored in the storage subsystem 54. Also in a preferred embodiment, the method 150 is performed by the processor(s) 52. The columns for which the method 150 is used are preferably those columns used in a particular query. Thus, the cardinality being estimated by the method 150 may be used in determining a desired query execution plan. The method 150 is also preferably performed for columns in a group, or key, which have been subject to operation(s) such as grouping and/or duplicate removal operations. The columns on which the method 150 operates are, therefore, termed the key.

Statistics for the key are obtained, via step 152. Step 152 obtains both group statistics and single column statistics. The statistics obtained in step 152 are preferably the same as those statistics discussed above with respect to step 110 of the method 100. In particular, the group statistics are in the form of column group statistics providing a CGS value for a particular set of columns.

The statistics are homogenized via step 154. In homogenization, if the set of columns for which the column group statistics are obtained includes column(s) not in the key and such column(s) are equivalent to column(s) in the key, the columns in the set are replaced by equivalent columns in the key. For example, suppose the set includes columns {a,b,x} and the key includes columns {a,b,c,d,e,f}. In addition, suppose that column x is equivalent to column 3. In such a case, step 154 replaces column x in the set with column e. Consequently, the statistics are then normalized, where desired, via step 156. In normalization, if, after homogenization, the set of columns for which the column group statistics are obtained still includes column(s) not in the key, those columns will be removed from the set. For example, suppose the set includes columns {a,b,z} and the key includes columns {a,b,c}. In such a case, step 156 removes column z from the set. Thus, using steps 154 and 156, column equivalency, functional dependencies, and other established characteristics of the data can be used to improve the use of the group statistics in estimating the cardinality of the group of columns.

The key cardinality is set to infinity, via step 158. The key cardinality is the estimate of the cardinality of the group of columns calculated by the present invention. The key cardinality is then recursively calculated in subsequent steps. A set of columns for which column group statistics were obtained in step 152 is selected as the current set of columns, via step 160. The columns within the current set that are also in the key are determined, via step 162. These columns that are in both the key and the current set are termed the new key. It is determined whether the new key identically matches columns in the key which have already been accounted for in determining the key cardinality or, in a preferred embodiment, if no columns have been processed, via step 164. The columns which have already been accounted for in calculating the key cardinality are termed the old key. Thus, step 164 determines whether the new key matches the old key or if the old key is empty. If so, then the key cardinality is set to the minimum of a previous key cardinality and the CGS value of the current set of columns, via step 166.

For example, suppose the key includes columns {a,b,c,d}, a first set of columns includes {a,b,c} having a CGS value of CGS1 and the second set of columns includes {a,b,c,e,f} having a CGS value of CGS2. For the first set of columns, the new key is {a,b,c} and the old key is the empty set. Thus, the key cardinality is set to be the minimum of infinity and CGS1. Thus, after the first set of columns is processed the old key is {a,b,c} and the key cardinality will be CGS1. In the next iteration, the new key is {a,b,c} because columns e and f are not in the key. Using step 166, the key cardinality is set to the minimum of CGS1 and CBS2.

If the new key does not exactly match the old key, then it is determined whether the new key includes the old key plus at least one additional column, via step 168. If so, then the key cardinality is set to the minimum of the previous key cardinality multiplied by the column cardinality of each of the at least one additional column and the CGS value of the current set of columns, via step 170. The column cardinality used in step 170 may be recursively calculated.

For example, suppose the key includes columns {a,b,c,d}, a first set of columns includes {a,b,c,e,f,g} having a CGS value of CGS1 and the second set of columns includes {a,b,c,d} having a CGS value of CGS2. After the first set of columns is processed, as discussed above the old key is {a,b,c} and the key cardinality will be CGS1. In the next iteration, the new key is {a,b,c,d}. Using step 170, the key cardinality is set to the minimum of CGS1*(d) and CGS2, where d is the column cardinality of column d.

If the new key does not include all of the columns in the old key plus at least one additional key, then it is determined whether the new key includes some but not all of the columns in the old key, via step 172. Thus, it is determined in step 172 whether the old key includes the new key plus at least one difference column. If so, then the key cardinality is set to the minimum of the previous key cardinality and the CGS value for the current set of columns multiplied by the column cardinality of each of the difference column(s), via step 174. The column cardinality used in step 174 may be recursively calculated.

For example, suppose the key includes columns {a,b,c,d}, a first set of columns includes {a,b,c,d,e,f} having a CGS value of CGS1 and the second set of columns includes {a,b} having a CGS value of CGS2. After the first set of columns is processed, as discussed below, the old key is {a,b,c,d} and the key cardinality will be CGS1. In the next iteration, the new key is {a,b,c,d}. Using step 174, the key cardinality is set to the minimum of CGS1 and CGS2*(c)*(d) where c and d are the column cardinalities of columns c and d, respectively.

If the new key is not a subset of the previous key, then it is determined whether the new key includes some but not all of the columns in the old key, plus at least one additional column in the key, via step 176. Stated differently, it is determined whether the old key includes a portion of the new key plus at least a first other column, while the new key includes a portion of the old key plus at least a second additional column. If so, then the key cardinality is set to be the minimum of the previous key cardinality multiplied by the column cardinality for at least the second other column and the CGS value for a second portion of the plurality of columns multiplied by the column cardinality for each of the at least the first other column, via step 178. The column cardinality used in step 178 may be recursively calculated.

For example, suppose the key includes columns {a,b,c,d}, a first set of columns includes {a,b,c} having a CGS value of CGS1 and the second set of columns includes {c,d,f} having a CGS value of CGS2. After the first set of columns is processed, as discussed below, the old key is {a,b,c} and the key cardinality is CGS1. In the next iteration, the new key is {c,d}. Using step 17, he key cardinality is set to the minimum of CGS1*(d) and CGS2*(a)*(b) where a,b and d are the column cardinalities of columns a, b and d, respectively.

If it is determined that the new key does not include some but not all of the columns in the old key plus at least one additional column in the key, then it is determined whether the new key and the old key no dot intersect, via step 180. If so, then the key cardinality is set to be the previous key cardinality multiplied by the CGS value for the new key, via step 182.

For example, suppose the key includes columns {a,b,c,d}, a first set of columns includes {a,b} having a CGS value of CGS1 and the second set of columns includes {c,d,f} having a CGS value of CGS2. After the first set of columns is processed, as discussed below, the old key is {a,b} and the key cardinality is CGS1. In the next iteration, the new key is {c,d}. Using step 182, the key cardinality is set to CGS1*CGS2.

The old key is then updated to include those columns that have been accounted for in steps 162 through 182, via step 184. It is determined whether at least one additional set of columns for which column group statistics have been obtained is available, via step 186. If so, step 160 is returned to. Otherwise, the method 150 continues, as discussed below.

Any columns in the key that are not accounted for using group statistics are accounted for, via step 188. In a preferred embodiment, the key cardinality is multiplied by the column cardinality for each of the columns not accounted for using group statistics in step 188. Consequently, after step 188, the key cardinality should account for all columns in the key. Thus, all columns in the group of columns are processed. Finally, in a preferred embodiment, the key cardinality provided using group statistics and, where appropriate, single column statistics is compared against a cardinality provided using only single column statistics, and the minimum is provided as the cardinality for the key, via step 190. In a preferred embodiment, step 190 includes setting the key cardinality as the minimum of the key cardinality from step 188 and the product of the column cardinality values for each of the columns in the key. Thus, steps 154-190 are used in recursively calculating the key cardinality for the cardinality using group statistics.

Because group statistics and single column statistics are both used, the method 150 is able to detect and account for statistical correlation present in the underlying data and can better estimate the cardinality of the group of columns, or key. This could be of particular benefit in estimating cardinality after operations such as grouping or duplicate removal have been performed on the data. In particular, the method 150 may result in a smaller upper bound for the estimate of the cardinality for the key than the conventional method 10. As a result, operations that use the cardinality of the group of columns, such as selection of a query execution plan for columns in the key for the query, may be improved.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

A data processing system suitable for storing and/or executing program code will include at lest one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A method and system for estimating the cardinality in a group of columns has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for estimating a cardinality for a plurality of columns in a database system comprising:

obtaining statistics for the plurality of columns, a first portion of the statistics indicating at least one relationship between at least a portion of the plurality of columns, a second portion of the statistics including single column statistics; and utilizing the first portion and the second portion of the statistics to estimate the cardinality for the plurality of columns, including:

using column equivalency to determine which of the first portion and the second portion of the statistics to utilize in estimating the cardinality, including homogenizing the at least the second portion of the statistics if possible; and recursively calculating a key cardinality based upon the statistics, the key cardinality indicating the cardinality of the plurality of columns, the recursively calculating including:

setting the key cardinality to a minimum of a previous key cardinality for a first portion of the plurality of columns and a column group statistics value for a second portion of the plurality of columns if the first and second portions are the same;

setting the key cardinality to the minimum of the previous key cardinality multiplied by the column cardinality for each of at least one additional column and the column group statistics value for a second portion of the plurality of columns if the second portion of the plurality of columns includes the first portion of the plurality of columns and the at least one additional column;

setting the key cardinality to the minimum of the previous key cardinality and the column group statistics value for a second portion of the plurality of columns multiplied by the column cardinality for each of at least one difference column if the first portion includes the second portion plus the at least one difference column;

setting the key cardinality to the minimum of the previous key cardinality multiplied by the column cardinality for at least a first other column and the column group statistics value for a second portion of the plurality of columns multiplied by the column cardinality for each of the at least the second other column if the first portion includes a first part of the second portion of the plurality of columns plus at least the second other column and the second portion includes a second part of the first portion of the plurality of columns plus at least the first other column; and setting the key cardinality to the previous key cardinality multiplied by the column group statistics value for a second portion of the plurality of columns if the first and second portions do not intersect.

2. The method of claim 1 wherein the statistics obtaining further includes:

obtaining at least one of intersecting multi-column statistics, disjoint multi-column statistics, index statistics, and column group statistics collected for the at least the portion of the plurality of columns.

3. The method of claim 1 wherein the using further includes:

normalizing the at least the second portion of the statistics.

4. The method of claim 1 wherein the utilizing further includes:

setting the key cardinality to the previous key cardinality multiplied by the column cardinality for each column of the plurality of columns not being accounted for using the column group statistics.

5. The method of claim 4 further comprising: multiplying the column cardinality for each of the plurality of columns to provide a single-column-based cardinality; and setting the cardinality to the minimum of the key cardinality and the single-column-based cardinality.

6. A computer program product comprising a computer-readable medium containing a program for estimating a cardinality for a plurality of columns in a database system, the program including instructions for:

obtaining statistics for the plurality of columns, a first portion of the statistics indicating at least one relationship between at least a portion of the plurality of columns, a second portion of the statistics including single column statistics; and utilizing the first portion and the second portion of the statistics to estimate the cardinality for the plurality of columns, including:

using column equivalency to determine which of the first portion and the second portion of the statistics to utilize in estimating the cardinality, including normalizing the at least the second portion of the statistics, and homogenizing the at least the second portion of the statistics if possible; and recursively calculating a key cardinality based upon the statistics, the key cardinality indicating the cardinality of the plurality of columns, the recursively calculating including:

setting the key cardinality to a minimum of a previous key cardinality for a first portion of the plurality of columns and a column group statistics value for a second portion of the plurality of columns if the first and second portions are the same;

setting the key cardinality to the minimum of the previous key cardinality multiplied by the column cardinality from the single column statistics for each of at least one additional column and the column group statistics value for a second portion of the plurality of columns if the second portion of the plurality of columns includes the first portion of the plurality of columns and the at least one additional column;

setting the key cardinality to the minimum of the previous key cardinality and the column group statistics value for a second portion of the plurality of columns multiplied by the column cardinality for each of at least one difference column if the first portion includes the second portion plus the at least one difference column;

setting the key cardinality to the minimum of the previous key cardinality multiplied by the column cardinality for at least a first other column and the column group statistics value for a second portion of the plurality of columns multiplied by the column cardinality for each of the at least the second other column if the first portion includes a first part of the second portion of the plurality of columns plus at least the first other column and the second portion includes a second part of the first portion of the plurality of columns plus at least the second other column; and setting the key cardinality to the previous key cardinality multiplied by the column group statistics value for a second portion of the plurality of columns if the first and second portions do not intersect.

7. The computer program product of claim 6 wherein statistics obtaining instructions further include:

obtaining at least one of intersecting multi-column statistics, disjoint multi-column statistics, index statistics, and column group statistics collected for the at least the portion of the plurality of columns.

8. The computer program product of claim 6 wherein the utilizing instructions further include instructions for:

setting the key cardinality to the previous key cardinality multiplied by the column cardinality from the single column statistics for each column of the plurality of columns not being accounted for using the column group statistics.

9. The computer program product of claim 8 further comprising:
multiplying the column cardinality for each of the plurality of columns to provide a single-column-based cardinality; and
setting the cardinality to the minimum of the key cardinality and the single-column-based cardinality.

10. A system for estimating a cardinality for a plurality of columns in a database system, the system comprising:
a storage subsystem storing a plurality of database objects including the plurality of columns; and
a processor obtaining statistics for the plurality of columns, a first portion of the statistics indicating at least one relationship between at least a portion of the plurality of columns, a second portion of the statistics including single column statistics, the processor also utilizing the first portion and the second portion of the statistics to estimate the cardinality for the plurality of columns, wherein in utilizing the first portion and the second portion, the processor further normalizes the statistics, homogenizes the statistics if possible, recursively calculating a key cardinality for the plurality of columns, multiplying the column cardinality for each of the plurality of columns to provide a single-column-based cardinality, and setting the cardinality to be the minimum of the key cardinality and the single-column-based cardinality, the recursively calculating including:
setting the key cardinality to a minimum of a previous key cardinality for a first portion of the plurality of columns and the column group statistics value for a second portion of the plurality of columns if the first and second portions are the same;
setting the key cardinality to the minimum of the previous key cardinality multiplied by the column cardinality from the single column statistics for each of at least one additional column and the column group statistics value for a second portion of the plurality of columns if the second portion of the plurality of columns includes the first portion of the plurality of columns and the at least one additional column;
setting the key cardinality to the minimum of the previous key cardinality and the column group statistics value for a second portion of the plurality of columns multiplied by the column cardinality for each of at least one difference column if the first portion includes the second portion plus the at least one difference column;
setting the key cardinality to the minimum of the previous key cardinality multiplied by the column cardinality for at least a first other column and the column group statistics value for a second portion of the plurality of columns multiplied by the column cardinality for each of the at least the second other column if the first portion includes a first part of the second portion of the plurality of columns plus at least the first other column and the second portion includes a second part of the first portion of the plurality of columns plus at least the second other column;
setting the key cardinality to the previous key cardinality multiplied by the column group statistics value for a second portion of the plurality of columns if the first and second portions do not intersect; and
setting the key cardinality to the previous key cardinality multiplied by the column cardinality for each column of the plurality of columns not being accounted for using the column group statistics.

* * * * *